United States Patent

[11] 3,614,314

| [72] | Inventor | Francis Henry Sand Rossire<br>Salisbury, Conn. |
|---|---|---|
| [21] | Appl. No. | 624,785 |
| [22] | Filed | Mar. 21, 1967 |
| [45] | Patented | Oct. 19, 1971 |
| [73] | Assignee | The Bendix Corporation<br>Continuation-in-part of application Ser. No. 315,188, Oct. 10, 1963, now abandoned. |

[54] OPTICAL DISPLAY MEANS FOR AN ALL-WEATHER LANDING SYSTEM OF AN AIRCRAFT
18 Claims, 10 Drawing Figs.

[52] U.S. Cl. ..................................................... 178/7.88,
178/6.5, 343/108 SM, 350/174, 350/298
[51] Int. Cl. ........................................................ H01j 29/89,
G02b 27/14
[50] Field of Search ............................................ 343/108 SI;
178/DIG. 1, 6.5, 7.85, 7.88, 7.89; 350/7, 34, 35,
315, 285, 289, 298, 171, 174; 250/233, 217 CR

[56] References Cited
UNITED STATES PATENTS

| 1,752,477 | 4/1930 | Brewster | 350/171 X |
|---|---|---|---|
| 3,059,519 | 10/1962 | Stanton | 343/108 (SI) UX |
| 3,128,623 | 4/1964 | Gold | 343/108 (SI) UX |
| 3,237,194 | 2/1966 | Curry et al. | 343/108 (SI) |
| 2,426,184 | 8/1947 | Deloraine et al. | 343/108 (SI) |
| 2,510,848 | 6/1950 | Wood | 350/315 |
| 3,005,185 | 10/1951 | Cumming et al. | 343/108 (SI) |
| 3,005,197 | 10/1961 | Shearer | 343/12 |
| 3,205,303 | 9/1965 | Bradley | 178/6 (IND) |
| 3,303,739 | 2/1967 | Chitayat | 350/7 |
| 3,436,840 | 4/1969 | Noxon | 35/12 |

*Primary Examiner*—Rodney D. Bennett, Jr.
*Assistant Examiner*—T. H. Tubbesing
*Attorneys*—Herbert L. Davis and Plante, Hartz, Smith and Thompson

ABSTRACT: An optical means to display immediately before both eyes of a pilot of an aircraft in pictorial fashion an image of substantial spacial identity to that of a physical array of beacons on the ground combined with a view of real world information during conditions of low visibility as well as improved means in which a partially reflecting mirror means may be interposed in immediate juxtaposition before the eyes of a person in such a manner that there may be readily apprehended the real world information by looking through the mirror means, while information superimposed thereon for displaying to the pilot full data by which the landing of the aircraft may be effected or auxiliary data to that being actually used for landing to promote pilot confidence and provide a basis for the exercise of judgement on the part of the pilot in monitoring an automatic pilot system.

INVENTOR.
FRANCIS HENRY S. ROSSIRE
BY
*Herbert L. Davis*
ATTORNEY

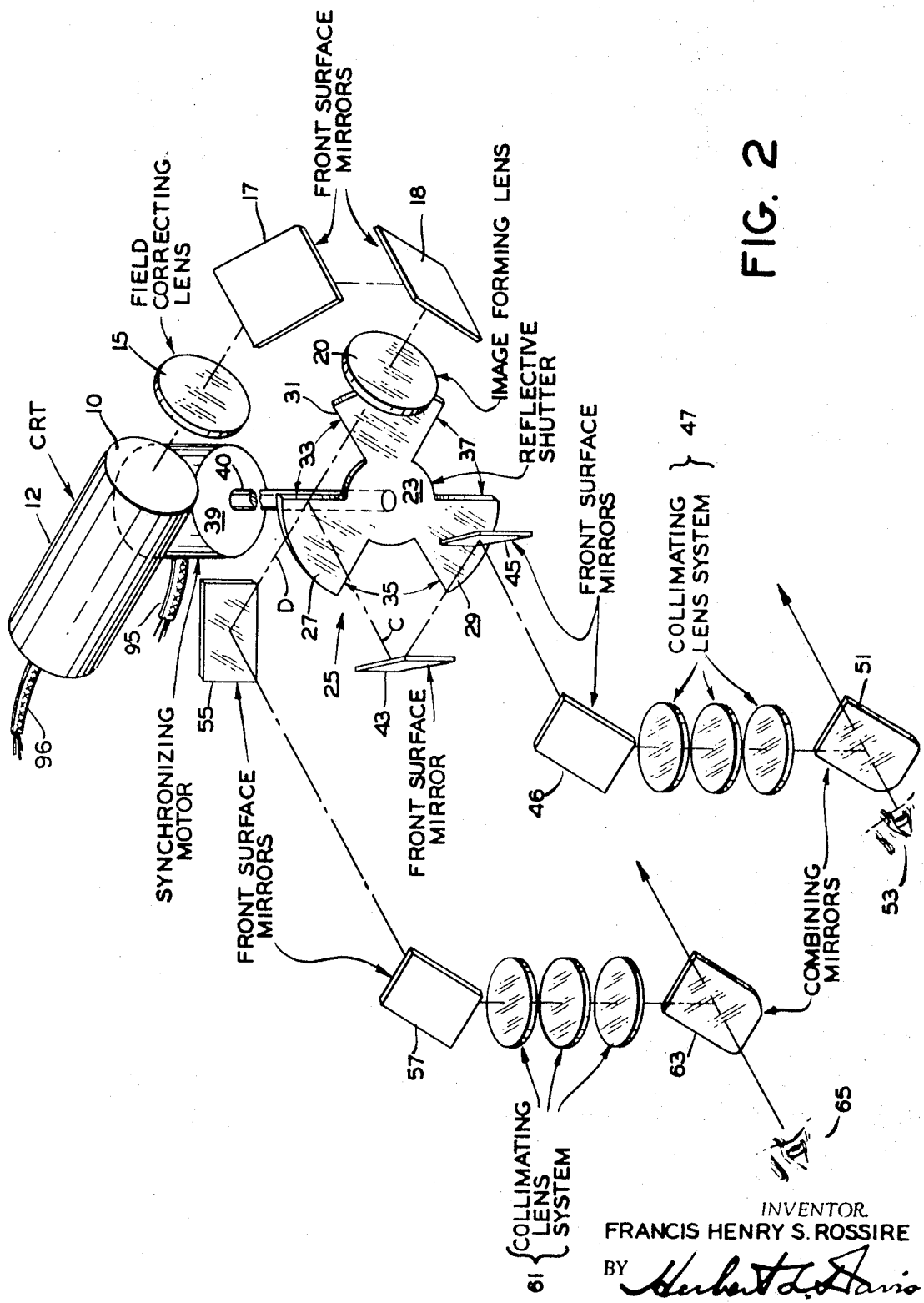

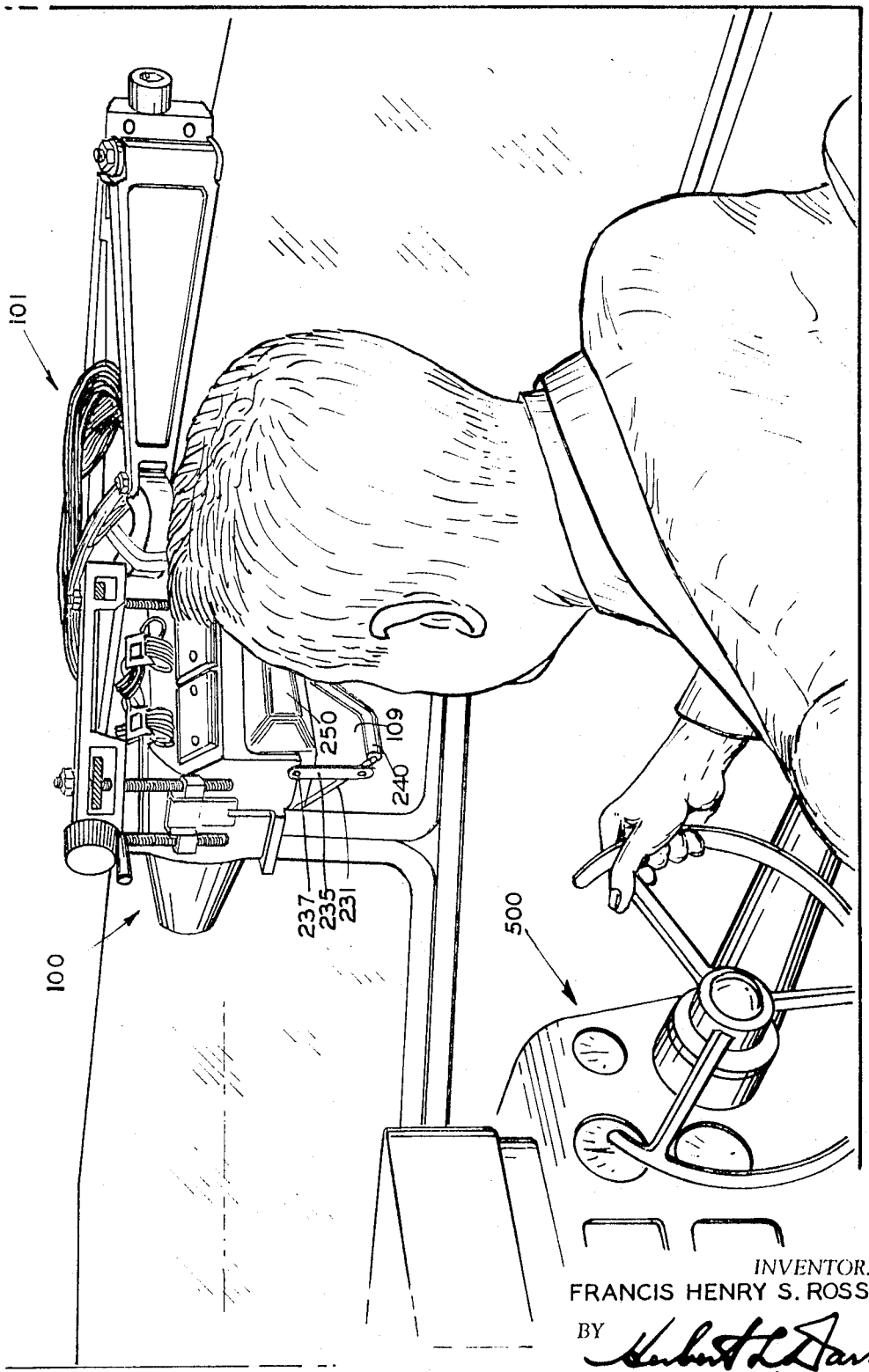

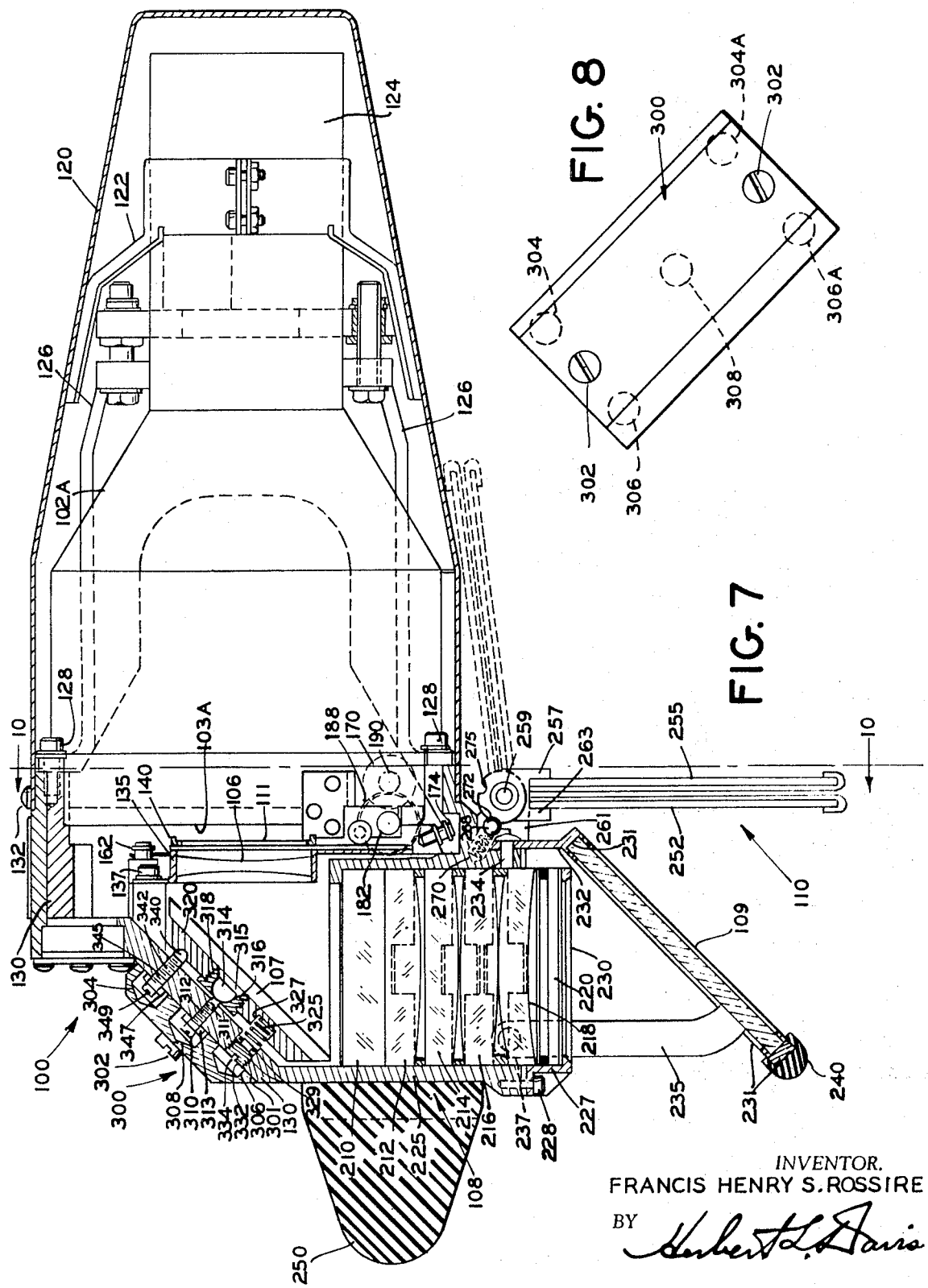

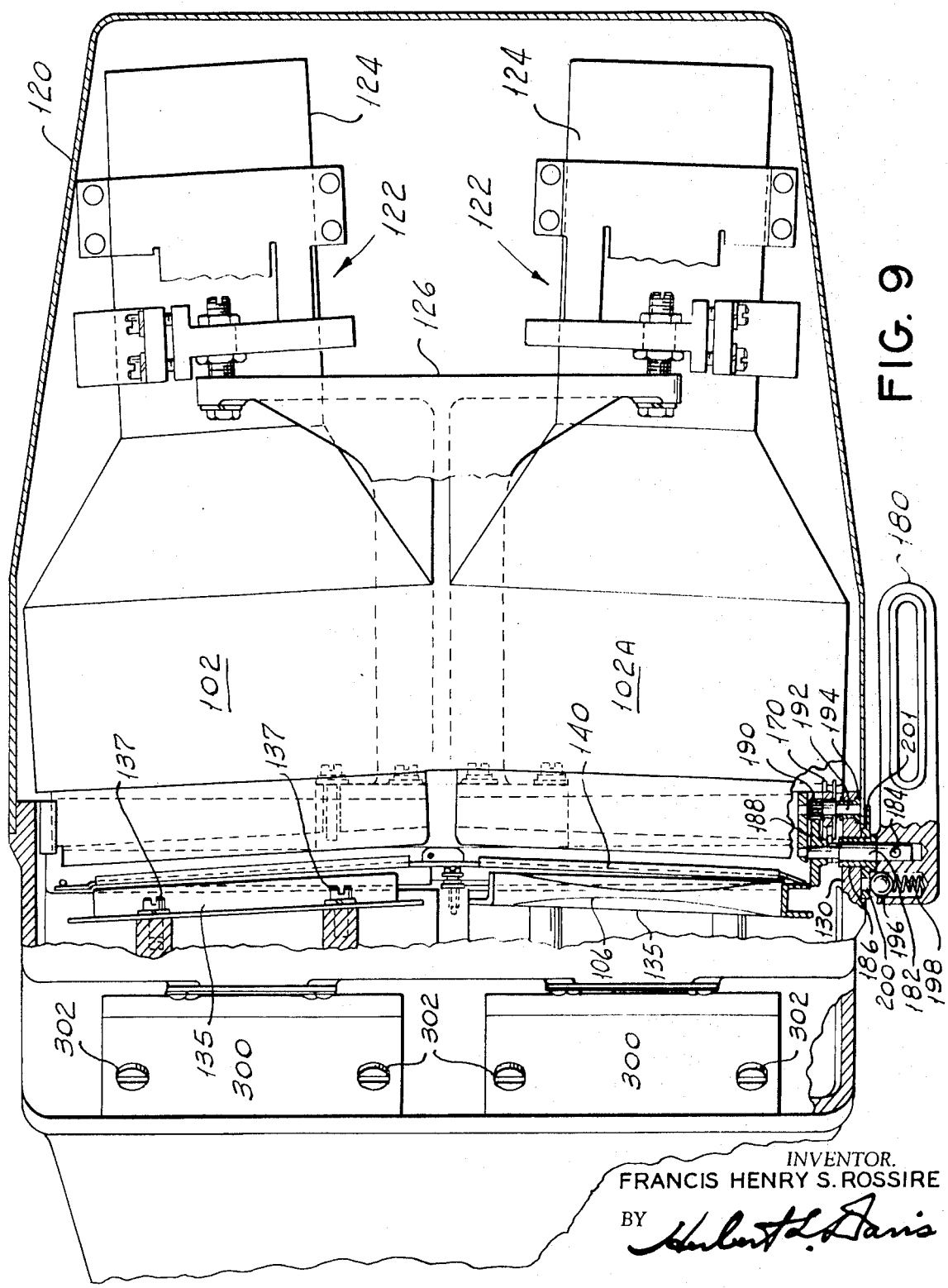

OPTICAL DISPLAY MEANS FOR AN ALL-WEATHER LANDING SYSTEM OF AN AIRCRAFT

CROSS-REFERENCE TO RELATED APPLICATIONS

This application is a continuation in part as to all common subject matter of a U.S. Application Ser. No. 315,188 filed Oct. 10, 1963 by Francis Henry S. Rossire, now abandoned. A modified form of the invention illustrated schematically in FIG. 6 has been described and claimed in a copending U.S. Application Ser. No. 872,909 filed Oct. 31, 1969 by Francis Henry S. Rossire as a division and continuation in part as to all common subject matter of the present U.S. Application Ser. No. 624,785. All of said applications have been assigned to The Bendix Corporation.

BACKGROUND OF THE INVENTION

1. Field of the Invention

An optical display means for an all-weather landing system of an aircraft embodying improvements in a display means for a vehicle approach system.

2. Description of the Prior Art

The invention relates to improvements in a display system, such as disclosed and claimed in a U.S. Pat. No. 3,237,195, granted Feb. 22, 1966 to Julius Schiffman for an all-weather approach system and to improvements in the display means disclosed and claimed in a U.S. Pat. No. 3,230,819, granted Jan. 25, 1966 to Paul A. Noxon, both of which patents have been assigned to The Bendix Corporation, assignee of the present invention.

Heretofore, it has been a well-known expedient to effect a display at both eyes of a person from either a single cathode-ray tube or a double cathode-ray tube display and combine light rays from images appearing on a screen of the single cathode-ray tube or each double cathode-ray tube with light rays from a distant object as explained in U.S. Pat. No. 2,539,405 granted Jan. 30, 1951, to Edmond M. Deloraine et al., U.S. Pat. No. 3,005,197, granted Oct. 17, 1961, to Douglas G. Shearer; and U.S. Pat. No. 3,059,519, granted Oct. 23, 1962, to Austin N. Stanton.

The prior operative arrangement and assembly of such a single or double cathode-ray tube display has presented, however, many disadvantages in the complexity and size of the assembly and efficiency of operation thereof.

Moreover, in heretofore effecting a wide range of operation of the cathode-ray tube display under varying ambient sunlight and night operating conditions it has been found impossible to sufficiently adjust the brightness of the cathode-ray tube display solely through electronic control means in order to obtain a predetermined desired contrast ratio between the cathode-ray tube display and the real outside world light conditions as viewed through a partially reflecting mirror means.

Heretofore, means have been developed as described and claimed in the aforenoted U.S. Pat. No. 3,237,195, whereby there may be applied in a rectangular coordinate system, on the screen of a cathode-ray tube, a spot representing the angular position of a radar beacon relative to the boresight of an aircraft, both vertically and horizontally. Since a number of these can be plotted simultaneously, there may be obtained by outlining the runway with beacons, a picture of the runway on the cathode-ray tube screen, as outlined by such beacons, which appear as lights on the screen. Means to effect this technique are disclosed and claimed in the aforenoted U.S. Pat. No. 3,237,195.

However, if the pilot attempt to use a small picture of this sort directly for landing an aircraft or as a geometrical data display for judging the performance of a landing system, the pilot may be confronted by the problem of relative scale. It is difficult for this reason for the pilot to instantly comprehend this spatial relationship to the runway in the way that he can do this if, in fact, he can see the ground, where things are seen substantially as infinity and at 1:1 scale.

SUMMARY OF THE INVENTION

The invention contemplates the provision of means whereby there may be displayed through a binocular headset an image produced by the technique of the aforenoted U.S. Pat. No. 3,237,195 in such a way that the aforenoted problem of the scale of the projected picture of the runway may be almost entirely overcome.

The invention contemplates as another object, the provision of a novel headset structure in which a partially reflecting mirror means may be interposed in immediate juxtaposition before the eyes of a person in such a manner that there may be readily apprehended the real world information by looking through the mirror means, while information superimposed thereon from a screen of a cathode-ray tube or tubes and collimating lens systems may be reflected from it.

The invention further contemplates both a single and a double cathode-ray tube display means and may include a wide angle binocular type optically collimated head-up display means arranged to be mounted close to the eyes of the viewer and having a common combining mirror, but a separate lens system as well as separate cathode-ray tubes for each eye. Moreover, in the present invention by mounting the lens systems and combining mirror close to the eyes of the viewers, several inherent advantages are obtained in comparison to either a double or single cathode-ray tube system for both eyes in which the combining mirror is positioned at a more appreciable distance from the eyes of the viewer.

The invention comtemplates as further advantages:

1. A head-up optical display unit which is extremely small, light of weight and with an exceptionally wide angle of binocular view.

2. Because the eyes are normally on the optical axis and in close proximity to the combining mirror, aberrations such as spherical, chromatic, coma, astigmatism and curvature of field are reduced to a minimum.

3. By placing the head-up optical display means near the eyes, it is easier to obtain the required brightness contrast ratio of display to outside world. The head will effectively block any back lighting that might flood the combining mirror, and by the provision of selectively operable ambient filters there may be effectively attenuated the brightness normal to the eyes. The invention permits the use of lower cathode-ray tube brightness with the resultant reduction of high-driving potentials and a consequent reduction in electronic gear size and complexity so that a cathode-ray tube brightness of approximately 300 foot lamberts has been found adequate to meet the 10,000 lambert background requirement.

4. The head-up optical display means of the present invention includes a combining mirror and lens system which is effectively positioned close to the viewer's head so that valuable panel space is not required for use and further by placing the combining mirror and lens systems near the observers eyes and in underlaying relation to the eyes of the observer large angles of view are obtainable with relatively small combining mirror elements.

5. When not required for mission effectiveness, the head-up optical display unit may be so positioned that the combining mirror is out of the pilot's direct line of sight and, therefore, cannot distort or attenuate the outside world viewed by the pilot.

The Binocular Head-Up Display means of the present invention features independent optical systems for each of the one or two cathode-ray tubes in which the optics are effectively bent through two 90° angles to provide a compact package.

The invention may include a mechanical reticle in the optical path, as well as removable ambient light filters to effectively attenuate the possible 10,000 feet lambert ambient light level such that a usable symbolic display can be presented to the pilot with a cathode-ray tube which provides a brightness level of approximately 300 foot lamberts.

In order to satisfy stringent requirements for a small cathode-ray tube screen of spot size, and a display unit of extreme accuracy and wide field of view, a Binocular Head-Up Display System has been provided which may include an extremely small cathode-ray tube or a pair of cathode-ray tubes, such as miniature two-inch diameter electromagnetically deflected and electrostatically focused cathode-ray tubes, so as to provide an optical display means of small size and compact assemblage.

Another object of the invention is to provide a binocular headset for use by the pilot of an aircraft, including therein a single cathode-ray tube having a screen for displaying an outline of the microwave beacons on the landing field, together with a proportional reflector-transmitter to split the beam from the screen of the cathode-ray tube so as to enable each eye of the pilot to view the cathode-ray tube screen through separate collimating lens systems.

Another object of the invention is to provide in the aforenoted arrangement a reflector-transmitter through which the rays emanating from the cathode-ray tube screen may be alternately reflected as rays from a reflecting shutter and transmitted as rays through spaces in the reflecting shutter, and in which arrangement the proportional reflector-transmitter is rotated at a required speed by a motor carried in the headset so that the reflector-transmitter is divided "time wise" into equal reflective and transmissive areas.

Another object of the invention is to provide in the aforenoted binocular headset arrangement a cathode-ray tube and means whereby an illusion may be created in which each eye will obtain a clear, unattenuated picture of the cathode-ray tube screen and which illusion depends upon a characteristic of the human eye termed persistence of vision causing the image transmitted through the reflector-transmitter to the eyes of the pilot to linger in the brain of the pilot for a fraction of a second after the object has gone.

Another object of the invention is to provide in the novel binocular headset an arrangement in which there is interposed between a viewing mirror for each eye of the pilot and the cathode-ray tube of the aforenoted vehicle approach system, a lens or lens system such that there may be provided parallel exit rays whereby the pilot's eyes may see the picture on the cathode-ray tube screen as though it were in infinity focus and in which an image appearing on the screen may provide a 1:1 relationship between the size of the image combined at the viewing mirror means and the real world scene inasmuch as the vehicle approach system described in the aforenoted U.S. Pat. No. 3,237,195 is so organized and arranged as to produce an image size on the screen of the cathode-ray tube such that the aforenoted objective may be obtained at the viewing mirror means.

Another object of the invention is to provide in the binocular hedset a novel arrangement of a pair of combining mirrors or a single combining mirror positioned in an overlaying relation to the eyes of the viewer and operatively connected with a single cathode-ray tube or double cathode-ray tubes through a collimating lens system carried in the headset and through which mirrors or mirror the display on the screen of the cathode-ray tube or tubes may be conveniently viewed by both eyes of the pilot in a superimposed relation to an image of a distant object viewed through the combining mirrors or mirror.

Another object of the present invention is to simplify the assembly of such cathode-ray tube display and improve the efficiency of operation thereof.

Another object of the invention is to provide a light filter means operable in a sense to reduce the effective light rays of the cathode-ray tube or tubes under low-ambient light conditions, as under night flying conditions, and another light filter means operable in a sense to reduce the effective ambient light rays under high-ambient light conditions as during very bright daytime flying conditions and the first and second mentioned light filter means being operable in conjunction with suitable cathode-ray tube brightness electronic control means to obtain the predetermined desirable contrast ratio of the cathode-ray tube display to the varying ambient light conditions of the real outside world.

Another object of the invention is to provide a novel slidably adjustable means for effectively positioning a light filter means in and out of operative relation between the cathode-ray tube screen and the lens system of the optical display means.

Another object of the invention is to provide a novel angularly adjustable means for selectively positioning a light filter means in and out of operative relation between the direct view and the combining mirror to correct for ambient light conditions.

Another object of the invention is to provide a convenient pantograph supporting structure for carrying the binocular headset in alignment with the pilot's eyes and also in the proximity of the instrument panel of the aircraft so that the pilot may effectively view in the partially reflecting mirror of the binocular headset the image of the landing conditions of the aircraft provided by the cathode-ray tube means together with the true landing conditions of the aircraft discernible through the mirror means while concurrently the eyes of the pilot may be directed to the instruments on the panel in the proximity of the binoculars so as to enable the pilot to effectuate a landing of the aircraft.

These and other objects and features of the invention are pointed out in the following description in terms of the embodiments thereof which are shown in the accompanying drawings. It is to be understood, however, that the drawings are for the purpose of illutration only and are not a definition of the limits of the invention. Reference is to be had to the appended claims for this purpose.

DESCRIPTION OF THE DRAWINGS

In the drawings corresponding numerals indicate corresponding parts in the several views:

FIG. 2 is a schematic view of an optical system embodying one form of the invention applied in the headset of FIG. 1 and transmitting a beam from a screen of a single cathode-ray tube to both eyes of the viewer through separate collimated lens systems.

FIG. 4 is a perspective view of a modified form of binocular headset embodying the invention and shown in typical use by the pilot of an aircraft. The binocular headset is shown supported in an operative relation by a supporting arm structure in a proximity relation to the instrument panel of the aircraft so that the pilot may view in a partially reflecting mirror means an image of the landing conditions of the aircraft provided by the cathode-ray tube meanswhile concurrently the eyes of the pilot may be directed to the true landing of the aircrft discernible through the partially reflecting mirror means and to the instrument panel in the proximity of the binoculars so as to enable the pilot to effectuate a landing of the aircraft.

FIG. 7 is a longitudinal view of the optical display unit of FIG. 4 with certain parts broken away so as to show the operative parts and compact arrangement of the optical system.

FIG. 8 is a top plan view of the cover plate for an adjustable setting means to angularly position a reflecting mirror in the optical system of FIG. 7.

FIG. 9 is a top plan view of the topical display unit of FIG. 7 with a portion of the top cover broken away so as to show the operative parts therein, including the dual cathode-ray tubes, light filters, field lenses and mounting means therefor.

DESCRIPTION OF THE INVENTION

In the vehicle approach system with which the novel optical display means of the present invention is adapted for use, a display of real worl information is provided in which the landing area or runway for an aircraft is to be outlined by microwave beacons by a technique and in a manner similar to the array of beacons described in the aforenoted U.S. Pat. No. 3,237,195.

These beacons may transmit pulses on the order of a microsecond in length, at a rate of, perhaps 400 a second. They fire at random, and no synchronization or sequencing is required. Except for the requirement of avoiding reflections from terrestrial objects, there is also no particular requirement for directivity of the radiation pattern. In the aircraft there may be provided equipment which measure, passively and without appreciable timelag, the direction, relative to aircraft boresight, both laterally and vertically, of each pulse as it arrives. These pulses are translated into horizontal and vertical distances, and for each pulse is plotted a bright spot on the screen of a cathode-ray tube in its appropriate coordinate position, as shown in the aforenoted U.S. Pat. No. 3,237,195. A summation of all of these spots results in a pictorial presentation of the runway as though outlined by lights at night.

Figures 1, 3:
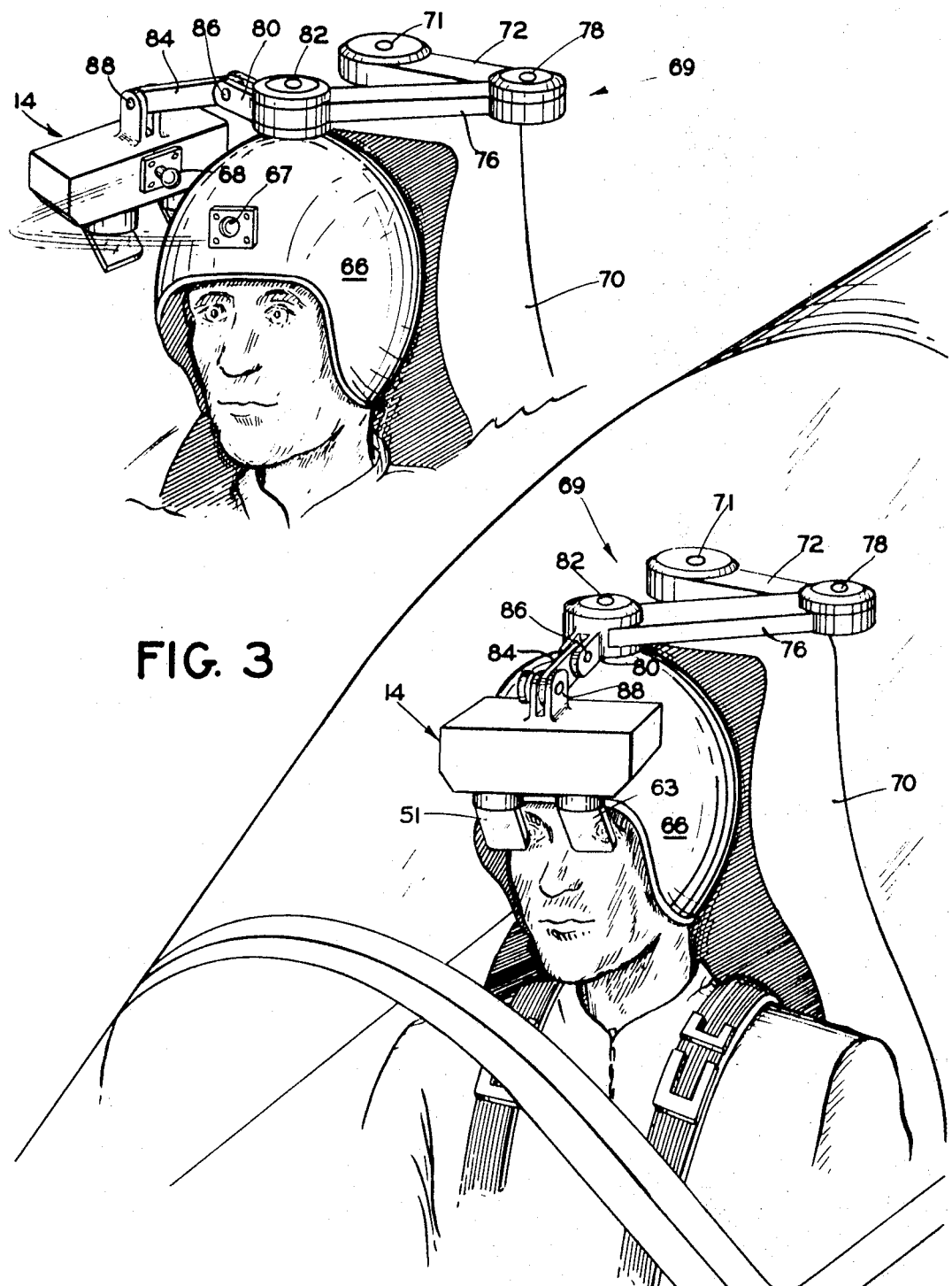
FIG. 1 is a perspective view of a binocular headset embodying one form of the invention and which is shown in use by the pilot of an aircraft with the headset held in an operative relation by a supporting arm structure.
FIG. 3 shows the binocular headset of FIG. 1 adjusted to one side of the pilot so as to show a ball and socket means for fastening the headset to the helmet of the pilot.

As shown schematically in FIG. 2, the pictorial presentation of the runway may be generated on the screen 10 of a cathode!-ray tube 12 which is carried in that portion of the headset of the pilot indicated generally by the numeral 14, as shown in FIG. 1.

In order to make maximum use of the picture, thus generated on the screen 10 of the cathode-ray tube 12, it is necessary that the same be projected into the line of the pilot's vision.

As shown in FIG. 2, this is accomplished through the field correcting lens 15 which directs the beam from the cathode-ray tube screen 10 to a pair of front surface mirrors 17 and 18 which in turn reflect the beam into an image forming lens 20. The rays of light emanating from the cathode-ray tube screen 10 are directed through the image forming lens 20 into a proportional reflector-transmitter indicated generally by the numeral 25.

The proportional reflector-transmitter 25 includes reflecting shutter members 27, 29 and 31 projecting in equal-spaced relation from a rotating member 23. The shutters 27, 29, and 31 have reflective surfaces so arranged that the rays emanating from the cathode-ray tube screen 10 may be alternately reflected as rays from the reflecting shutters and as rays transmitted through spaces 33, 35, and 37 beteen the shutters and of equal size to that of the reflecting shutters 27, 29 and 31.

The proportional reflector-transmitter 25 is rotated at the required speed by a motor 39 drivingly connected thereto by a shaft 40 so that the reflector-transmitter 25 is in effect divided "time wise" into equal reflective and transmissive areas. Thus, the light transmitted from the reflective surfaces 27, 29, and 31 of the reflector-transmitter 25 is reflected by front surface mirrors 43, 45, and 46 through a collimating lens system 47 to a trichroic combining mirror 51 and thereby to one eye of the pilot indicated generally by the numeral 53.

On the other hand, the light rays directed by the image forming lens 20 through the spaces 33, 35, and 37 of the reflector-transmitter 25 are reflected by front surface mirrors 55 and 57 through a second collimating lens system 61, identical to that of the system 47, to a trichroic combining mirror 63 and thereby to the other eye of the pilot indicated by the numeral 65.

In the aforenoted arrangement, it will be seen that the rays emanating from the screen 10 of the single cathode-ray tube 12 will be split into rays C and D by the action of the proportional reflector-transmitter 25 so that the rays emanating from the screen 10 of the cathode-ray tube 12 are alternately reflected as rays C from the reflective faces of the shutters 27, 29 and 31 to the front surface mirror 43 and as rays D transmitted through the spaces 33, 35, and 37 between the shutters to the front surface mirror 55.

The mirror surfaces of the shutters 27, 29 and 31 may be of extremely high efficiency while the transmission efficiency through the spaces 33, 35, and 37 may be 100 percent because the proportional reflector-transmitter 25 is so construed as to allow the rays to pass unrestricted through these spaces.

The proportional reflector-transmitter 25 is rotated at the desired speed by the motor 39 through shaft 40 and the operation of the proportional reflector-transmitter is divided "time wise" into equal reflector and transmitter areas. Thus an illusion will be created in which each eye 53 and 65 of the pilot may obtain a clear, unattenuated picture of the cathode-ray tube screen 10 applied at the combining mirrors 51 and 63. This illustion depends upon a characteristic of the human eye called persistence of vision. When the eye is looking at an object which suddenly disappears, persistence of vision causes the image to linger in the brain for a fraction of a second after the object has gone.

In order to make use of this phenomenon, the rays of the cathode-ray tube through the action of the proportional reflector-transmitter 25 appear again to the eye before the effect of the previous rays have died away. The brain is then unable to distinguish the gaps in the rays. The characteristic of the average eye is such that if a minimum of 48 bundles of rays from the cathode-ray tube per second are impressed upon the retina, a continuous image of the cathode-ray tube will be apparent to the eyes of the pilot in viewing the same in the combining mirrors 51 and 63.

While the combining mirrors 51 and 63 may be of a partially silvered mirror type, there may be employed a trichroic reflecting film which has the property of being a very efficient reflector of a narrow frequency band of light and there may be employed in the system a filter or other suitable means to achieve a distinctive color to the image reflected at a point corresponding to the exit point of the mirrors 51 and 63, as explained in the aforenoted U.S. Pat. No. 3,230,819, granted Jan. 25, 1966 to Paul A. Noxon and assigned to The Bendix Corporation.

The cathode-ray tube 12, motor 39, proportional reflector-transmitter 25 and optical system shown in FIG. 2 are conveniently packaged in the binocular headset 14. The binocular headset 14, as shown by FIG. 3, has a suitable ball 68 projecting from the backside thereof and arranged to be received in a socket 67 mounted on the forward surface of the helmet 66 so as to provide a convenient ball and socket means for readily connecting and disconnecting the headset 14 from the pilot's helmet 66.

The headset 14, as shown in FIGS. 1 and 3, is carried by a pantograph supporting mechanism 69 including a fixedly mounted supporting pedestal 70 mounted behind a seat for the pilot. There is pivotally mounted on the pedestal 70 at 71 an arm 72 of the pantograph mechanism 69. A second arm 76 is pivotally connected at 78 to the arm 72 while an arm 80 is pivotally connected to the arm 76 by a pin 82. An additional arm 84 is pivotally connected at 86 to the arm 80. The arm 84 is further pivotally attached to the binocular headset 14 by a pin 88. The arrangement is such that the headset 14 will remain in alignment with the pilot's eyes and also in alignment with the boresight of the aircraft during the limited motion of the pilot's head permitted thereby.

Moreover, as shown by FIG. 1, the binocular headset 14 is positioned by the pantograph supporting mechanism 69 in proximity with an instrument panel of the aircraft immediately in front of the pilot. The instrument panel includes conventional type instruments utilized in the landing operation of the aircraft so that the pilot may view in the partially reflecting mirrors 51 and 63 the image of the landing conditions of the aircraft provided by the screen 10 of the cathode-ray tube 12, while concurrently the eyes of the pilot may be directed to the true landing conditions of the aircraft discernible through the partially reflecting mirrors 51 and 63 and to the instrument on the panel in the proximity of the binoculars to effectuate a safe landing of the aircraft. When not in use, the headset 14 may be adjusted to a position in back of the pilot or to one side of the pilot.

The motor 39 is connected through a cable 95 to an external source of electrical energy while a cable 96, shown in FIG. 2, electrically connects the cathode-ray tube 12 carried in the headset 14 with a suitable antenna system and receiver for presenting a picture on the screen 10 of the beacons on the landing field, as described in U.S. Pat. No. 3,237,195. The cables 95 and 96 extend through the arms 84, 80, 76, and 72 and bracket 70 to the source of electrical energy and receiver not shown. Light rays from the screen 10 are directed through the proportional reflector-transmitter 25 and lens systems of FIG. 2 to the combining mirrors 51 and 63. Each of the combining mirrors 51 and 63, as shown by FIG. 1, project from the underside of the headset 14 at an obtuse angle relative to said underside of the headset 14 toward the face of the observer and are positioned in an adjacent and underlaying relation to the respective eyes 53 and 65 of the pilot or observer.

The combining mirrors 51 and 63 have a patially reflecting surface at the near side thereof to the pilot so as to reflect therefrom the light rays directed thereto through the respective collimating lens systems 47 and 61 of the head set 14.

Thus the information superimposed thereon from the screen 10 may be reflected from the combining mirrors 51 and 63 and there may be viewed by the pilot in the combining mirrors 51 and 63 a reflected image in pictorial fashion of the physical array of beacons on the ground outlining the landing runway and of a reflected size corresponding to that of such of the beacons as might be viewable by the pilot in looking through the partially reflecting mirrors 51 and 63 under low visibility conditions.

MODIFIED FORM OF THE INVENTION

Figure 5:
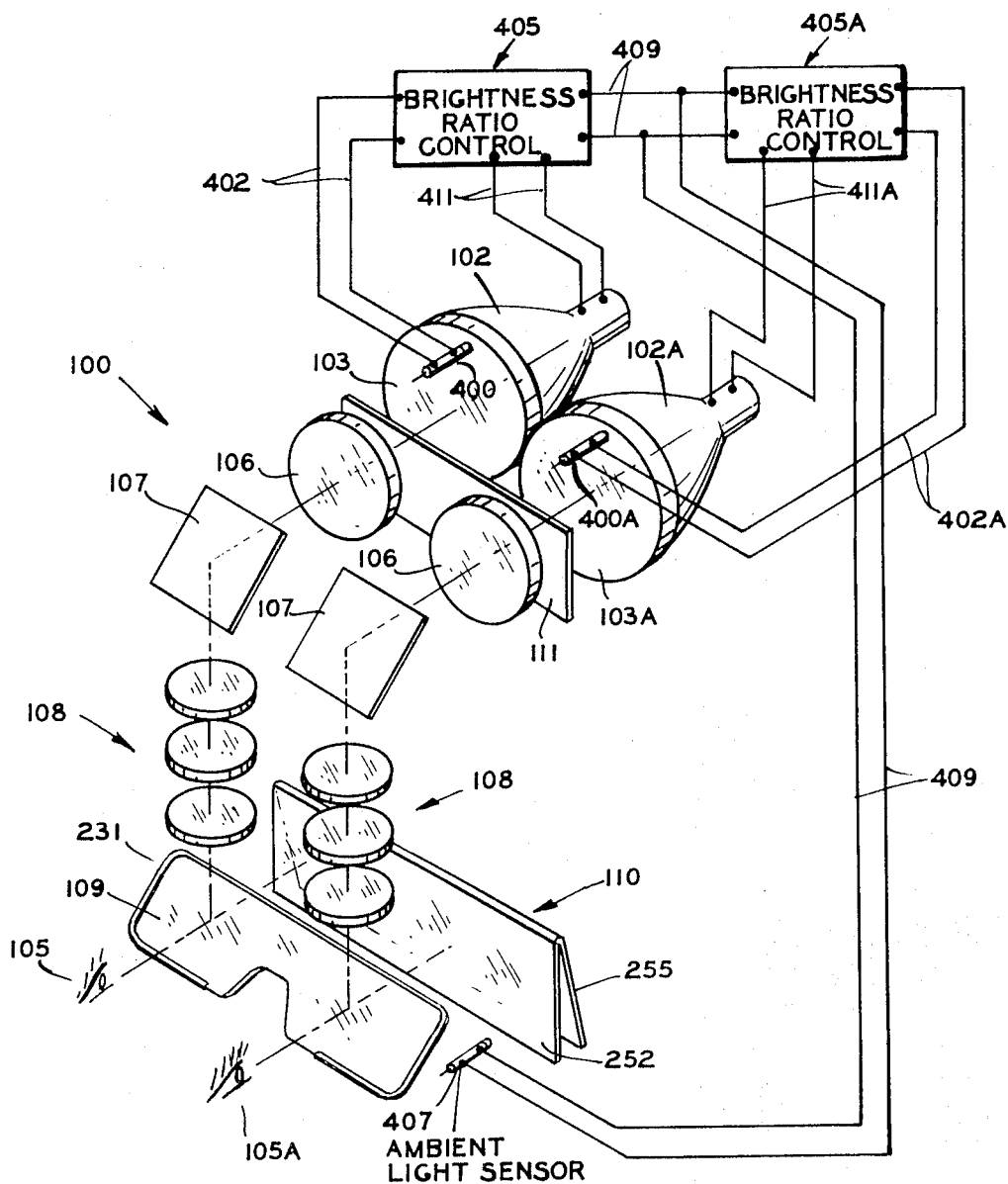
FIG. 5 is a schematic view of an optical system embodying a modified form of the invention as applied to the headset of FIG. 4 and transmitting images from screens of double cathode-ray tubes to the eyes of a viewer through separate collimating lens systems.

In the modified form of the invention of FIGS. 4 and 5, instead of splitting the beam of light from the screen 10 of a single cathode-ray tube 12 by the action of the reflective shutter 23, there is provided an optical display device 100 carried by a pantograph supporting mechanism 101 projecting from the interior structure of the cabin of the aircraft, and having a pair of cathode-ray tubes 102 and 102A, shown schematically by FIG. 5.

Each of the cathode-ray tubes 102 and 102A have displayed on the screens 103 and 103A, respectively, a pictorial presentation of the landing runway for the aircraft as outlined by microwave beacons by the technique and in a manner similar to that of the array of beacons described in the aforenoted U.S. Pat. No. 3,237,195.

The picture thus generated on the screens 103 and 103A of the cathode-ray tubes is projected into the line of vision of the eyes 105 and 105A of the observer, as shown in FIG. 5. This is accomplished through the provision of individual field lenses 106, front surface mirrors 107, collimating lens systems 108 and a single combining mirror 109 which as shown in FIG. 4 projects from the underside of the display device 100 at an obtuse angle relative to said underside of the display device 100 toward the face of the observer so as to be positioned inan adjacent and underlaying relation to the eyes of the observer.

There may be further provided, as shown in FIG. 5, selectively operable ambient light filters 110 which may be angularly positioned by the operator into an operative relation between the combining mirror 109 and the true world scene as viewed therethrough. The ambient light filters 110 may be selectively positioned, in and out of an operative relation, by the operator in conjunction with a cathode-ray tube brightness control, as hereinafter explained, to obtain a desired contrast ratio of the cacathode-ray tube display to the real outside world scene.

Further, there may be provided a light filter 111 which may be slidably positioned by the operator into an operative relation between the screens 103 and 103A and the field lenses 106, so as to reduce the brightness of the cathode-ray tube for night flight operating conditions, since it has not been found feasible to reduce the brightness of the cathode-ray tube sufficiently through electronic means.

The optical system, thus shown schematically in FIG. 5, is assembled in a compact optical display device 100 shown generally in FIG. 4 and in structural detail in FIGS. 7 through 10 inclusive.

Referring now to FIGS. 7 and 9, it will be seen that the cathode-ray tubes 102 and 102A are mounted within a casing or cover 120 by suitable clamps 122 fastened about mounting members 124 of the cathode-ray tubes 102 and 102A. The clamps 122 are in turn carried by a bracket 126 secured by bolts 128, as shown by FIG. 7, to a suitable base member 130. The casing 120 has an open end which fits tightly around a cooperating flange portion of the base member 130 and is affixed thereto by bolts 132.

As shown by FIGS. 7 and 9, field lenses 106 are positioned in alignment with the screen 103 and 103A, respectively, of the cathode-ray tubes 102 and 102A, while a front surface mirror 107 is positioned in a predetermined angular relation thereto so as to reflect the light rays directed through the field lens 106 to a collimating lens system indicated generally by the numeral 108.

The field lenses 106 are carried by frames 135 fastened to the base member 130 by suitable bolts 137. Further, slidably positioned in and out of operative relation between the field lenses 106 and the screen 103 and 103A of the cathode-ray tubes 102 and 102A, respectively, is a light filter element 111 carried by a frame 140.

Figure 10:
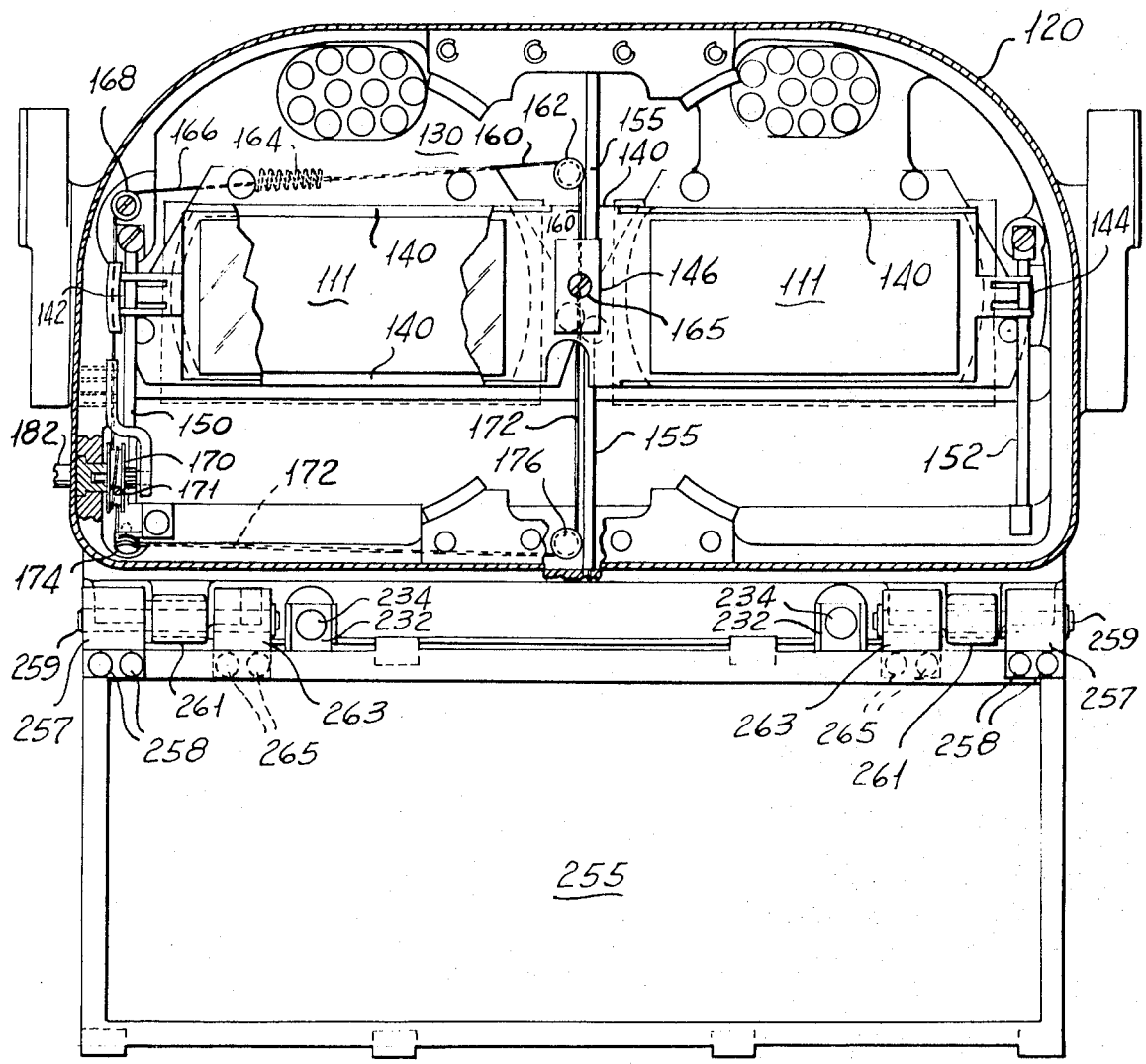
FIG. 10 is a cross-sectional view of the optical display units taken along the line as 10—10 of FIG. 7 and looking in the direction of the arrows.

As shown in FIG. 10, the light filter 111 is mounted in suitable frames 140 which have fastened at opposite ends thereof slidable elements 142 and 144 and intermediate the frames 140 and affixed to the frames 140 is a third slidable element 146. The elements 142, 144 and 146 are slidably mounted on rods 150, 152 and 155, respectively, as best shown by FIG. 10. These rods are mounted in the base member 130 and serve to support the light filter elements 111 for slidable movement by the operator and in and out of operative relation relative to the screen 103 and 103A of the cathode-ray tubes 102 and 102A.

In order to operatively position the light filter elements 111 from one position to the other position, there is provided, as shown in FIG. 10, a cable 160 attached at one end to an end of a tension spring 164 and passing over a pulley 162 and through the slidable element 146. The cable 160 is attached to the slidable element 164 by a setscrew 165, while the opposite end of the tension spring 164 is connected to an opposite end portion 166 of the cable 160 which in turn passes over a pulley 168 to a drum 170 on which the portion 166 of the cable 160 is secured by a second setscrew 171. The portion 166 of the cable 160 may be wound upon the drum 170 upon rotation of the drum 170 in one sense or unwound therefrom upon rotation of the drum 170 in an opposite sense. Further, leading from the drum 170 is another portion 172 of the cable 160 which passes over a pulley 174 and over another pulley 176 with the portion 172 of the cable being attached by the setscrew 165 to the slidable element 146. The pulleys 162, 168, 174 and 176 are rotatably mounted on suitable pins secured to the base member 130.

The portion 172 of the cable 160 is arranged to be unwound from the drum 170 upon rotation of the drum 170 in one sense to wind the other portion 166 of the cable 160 thereon. The portion 172 being wound upon the drum 170 upon rotation of the drum 170 in the other sense serving to unwind the portion 166 therefrom. It will be seen then that upon rotation of the drum 170 in the one sense the portion 166 of the cable 160 will be drawn towards the drum 170 to increase the tension of spring 164 so as to raise the element 146 affixed to the cable 160 by the setscrew 165 and slidably mounted on the rod 155 so as to cause a corresponding upward movement of the light filters 111 to the operative position shown. Conversely upon rotation of the drum 170 in the other sense the portion 172 of the cable 160 will be drawn towards the drum 170 while the portion 166 of the cable 160 will be unwound from the drum 170 so that the element 146 is slidably positioned on the rod 155 in a downward sense and out of operative relation between the screens 103 and 103A and the field lenses 106.

As shown by FIG. 9 to effect the operation of the drum 170 to slidably position the light filter elements 111, there is provided an operator-operative arm 180 mounted exteriorly of the casing 120 and carried by a shaft 182 affixed to the arm 180 by a pin 184. The shaft 182 is mounted in a bushing 186 and may be angularly positioned in the base member 130. Affixed to the inner end of the shaft 182 is a gear 188 in toothed engagement with a pinion gear 190 fixed to a stub shaft 192 rotatably mounted in a bushing 194 carried by the base member 130. Affixed to the stub shaft 192 is the drum 170 for operation through the gearing 188 and 190 upon the operator-operative arm 180 being angularly positioned by the operator. The arm 180 carries a ball 196 biased by a spring 198 into engagement with a suitable detent 200 provided in a plate 201 upon angular adjustment of the arm 180 from one position to another to effectively position the light filter elements 111 in and out of operative relation between the field lenses 106 and the screens 103 and 103A of the respective cathode-ray tubes 102 and 102A.

Referring now to the collimating lens system 108 as shown in FIG. 7, it will be seen that the same includes a series of collimating lenses 210, 212, 214, 216, 218, and 220 conveniently stacked in a tubular portion 225 of the base member 130 so as to provide a collimating system. A cap portion 227 is fastened at the lower end of the tubular portion 225 and secured in position by fastening bolts 228. The collimating lens system 108 is thus positioned in alignment with an angularly positioned front surface mirror 107 and at a right angle to the screen 103A of the cathode-ray tube 102A and is so arranged as to direct light rays reflected from the front surface mirror 107 through an opening 230 in the cap portion 227. Thus, the image appearing on the screen of the cathode-ray tube is directed through the field lens 106 to the reflecting surface of the mirror 107 and thereby directed through the collimating lens system 108 and the opening 230 in the cap portion 227 to the partially reflecting combining mirror 109 angularly positioned in a spaced relation to the opening 230 in the cap 227. Thus the light rays are directed by the collimating system 108 through the opening 230 in the cap portion 227 onto the partially reflecting surface of the mirror 109. The partially reflecting mirror 109 is mounted in a frame 231 to which are attached arms 232 secured in turn to a lower portion of the tubular member 225 by bolts 234, as shown by FIGS. 7 and 10, while arms 235 secured to opposite end portions of the frame 231 of the combining mirror 109 are in turn fastened to the base member 130 by means of securing bolts 237, as shown by FIG. 7.

A suitable resilient plastic or soft rubber bumper or cushioning element 250 is secured by a suitable adhesive to the viewing side of the casing 130 so that the forehead of the observer may rest against the cushion 250 during use of the display device. For further pilot protection, a suitable resilient plastic or soft rubber cushioning element 240 is positioned along the lower edge of the frame 231 of the combining mirror 109.

Referring now to the ambient filter devices 110, it will be seen that the same include, as shown in FIGS. 7 and 10, a pair of ambient light filter elements indicated by numerals 252 and 255. The light filter element 255, as shown in FIG. 10, has mounted at the opposite ends thereof hinge devices 257 secured thereto by rivets or bolts 258 and pivotally mounted on hinge pins 259 carried by elements 261 projecting from the base member 130. Also pivotally mounted on the hinge pins 259 are hinge devices 263 which are secured to the light filter element 252 by rivets or bolts 265.

Each of the hinge devices 257 and 263 have cooperatively arranged in relation thereto a suitable detent device. One such detent device is shown in FIG. 7 as including a detent ball 268 formed by a spring 270 into a suitable detent opening 272 formed in the hinge member 257 upon the corresponding light filter element 252 or 255 or both being angularly positioned into an operative relation between the combining mirror 109 and the true world scene, as shown in FIG. 7.

Either or both of the light filter elements 252 and 255 may be selectively positioned by the operator to an angular position, as indicated by the dotted lines of FIG. 7, out of the operative relations shown in FIG. 7. In the latter position, the corresponding detent ball 268 is arranged to engage in a detent opening 275 formed in the hinge device 257 and 263 so as to retain the same out of the operative position, as shown in dotted lines in FIG. 7. Thus the ambient light filter elements 252 and 255 may be selectively positioned angularly into an operative relation between the combining mirror 109 and the true world scene so as to obtain a predetermined desirable contrast ratio between the cathode-ray tube display and that of the outside real world under varying daytime flying conditions, as for example to reduce the effective ambient light rays under high ambient light conditions as during very bright daytime flying conditions.

Referring now to the front surface mirrors 107 positioned within the base member 130, it will be seen that the same are angularly adjustable in relation to the field lenses 106 and the collimating lens systems 108. This angular adjustment of the front surface mirrors 107 may be effected in each case by similar adjustment mechanisms, one of which is shown in detail in FIG. 7.

As shown in FIGS. 7, 8 and 9, cover caps 300 are provided to protect the adjustment mechanism and these cover caps 300 are secured the outer surface of the base member 130 by suitable attachment screws 302, screw threadedly engaged in suitable screw-threaded holes formed in the base member 130. The cover cap 300 includes, as shown by dotted lines in FIG. 8, suitable cavities 304 and 306 formed in the underside at one end of the cover cap 300 while cavities 304A and 306A are formed in the underside of the cover cap 300 and at an opposite end thereof, and intermediate the cavities 304–306 and 304A–306A provided in the underside and at the opposite ends of the cover cap 300, there is provided a cavity 308 also formed in the underside of the cover cap 300.

As shown in FIG. 7, with the cover cap 300 secured in position by the fastening screws 302, the arrangement with the adjustment mechanism is such that there projects into the cavity 308, a cleft end 310 of a supporting stem 311 having a screw-threaded portion 312 in engagement with a screw-threaded hole formed in the base member 130 and locked in position by a locknut 313 engaged on an outer screw-threaded portion of the stem 311. There is further provided on an inner end of the stem 311 a semispherical ball 314 mounted in a cavity 315 provided in an adjustable retaining nut 316 screw threadedly engaged at 318 in a backplate 320 of the front surface mirror 107.

The backplate 320 of the front surface mirror 107 is positioned in a spaced relation to the inner surface of the base member 130, as shown in FIG. 7, so that the mirror may be angularly adjusted in relation thereto, as hereinafter explained, to effect a desired critical setting thereof.

Further, there is provided a spring 325 having one end positioned in a recess 327 formed in the baseplate 320 of the mirror 107. The opposite end of the spring 325 is positioned on a reduced diameter end portion of a retaining bolt 332. Suitable screw threads 331 are formed in the inner surface of the recess 329 for receiving the screw-threaded retaining bolt 332. The retaining bolt 332 has a cleft portion 334, at the opposite outer end thereof. The recess 306 formed in the underside of the cover plate 300 is so positioned as to coincide with the cleft outer end of the retaining bolt 332.

As shown in FIG. 7, the spring 325 acts to bias the lower end of the front surface mirror 107 in an angular relation about the semispherical ball 314 in a counterclockwise direction so that the opposite upper end of the baseplate 320 of the mirror 107 is positioned into an abutting relation with an inner end portion 340 of an adjustment stem 342. The stem 342 has a screw-threaded portion 345 in screw-threaded engagement in a suitable screw-threaded hole formed in the base member 130 and locked in an adjusted position by a locknut 347 engaged thereon. The locknut 347, cleft end portion 349 and outer end of stem 342 is received in the recess 304 formed in the underside of the cover plate 300, as best shown in FIG. 7.

Similar structure to that of the retaining bolt 332, biasing spring 325, as well as similar structure to that of the stem portion 342 and locknut 347, are provided in corresponding relation to the recesses 306A and 304A formed in the underside of the cover plate 300, as indicated by dotted lines in FIG. 8.

It will be seen then that upon removal of the cover cap 300 suitable adjustment by the operator of the respective stems 342 in relation to the biasing force of the springs 325 will effect a critical angular adjustment of the front surface mirror 107 in relation to the individual field lenses 106 and screens 103 and 103A of the respective cathode-ray tubes 102 and 102A. The mirrors 107 will be so critically adjusted then as to effect the desired reflection of the images appearing on the respective screens 103 and 103A through the collimating lenses 108 onto the combining mirror 109 to be viewed therethrough in relation to the true world scene by the eyes of the observer as indicated diagrammatically in FIG. 5 by the numerals 105 and 105A.

It has been found that a correct ratio of illumination of the respective photocathode tubes 102 and 102A must be maintained in accordance with a predetermined program dependent upon the prevailing ambient light. In order to effect the foregoing then, there are provided variable resistance photocells 400 and 400A responsive to the brightness of the respective photocathode tubes 102 and 102A and electrically connected through electrical conductors 402 and 402A into brightness ratio control networks 405 and 405A. The respective control networks 405 and 405A are also cntrolled by an ambient light sensor variable resistance photocell 407 responsive to the prevailing ambient light effective between the combining mirror 109 and the ambient light filter 110 and electrically connected through conductors 409 into the brightness ratio control networks 405 and 405A, as shown schematically by FIG. 5.

The brightness ratio control networks 405 and 405A may be of a type such as shown in a copending U.S. application Ser. No. 576,298, filed Aug. 31, 1966 by Paul A. Noxon, now U.S. Pat. No. 3,436,840, granted Apr. 8, 1969 and assigned to The Bendix Corporation, assignee of the present invention. The arrangement is such then that the brightness ratio control networks 405 and 405A effect electrical energization of the output conductors 411 and 411A to vary the brightness of the photocathode ray tubes 102 and 102A, respectively, so as to maintain a predetermined ratio in the brightness thereof with that of the prevailing ambient light.

The range of variations in the brightness of the cathode-ray tubes 102 and 102A that must be effective under the extremes of very bright daylight conditions as compared to nighttime flying conditions is such that it is not possible to reduce electronically the brightness of the cathode-ray tubes sufficiently to effect the extremes of such daytime and nighttime operation to provide the required ratios. This may be attributable to a deficiency in the operating range of the present day cathode-ray tubes rather than in the associated controlling electronics.

However, that may be, in order to effect with such cathode-ray tubes and the associated electronic controls, the required extremes in the controlled brightness of the screens 103 and 103A of the cathode-ray tubes 102 and 102A, respectively, there is provided a selectively operable light filter 111 to reduce the effective brightness of the cathode-ray tube screens under normal night operating conditions. There may be thus effected the required predetermined ratio between the brightness of the screen of the cathode-ray tube and that of the ambient light conditions prevailing under such night flying conditions. During daytime flying, of course, the light filter 111 will be slidably positioned by the operator out of operating relation.

Similarly, under daytime flying conditions with the light filter 111 out of operating relation, should the brightness of the daylight exceed a predetermined normal condition then the operator may selectively position one of the ambient light filters 110, for example light filter 252, out of the dotted line position shown in FIG. 7 into a position shown in solid lines between the combining mirror 109 and the true world view. Now should the prevailing brightness of the ambient light exceed a further predetermined excessive value, a second ambient filter 255 may be similarly selectively positioned by the operator into an operative position, as shown in FIG. 7 by solid lines. Under such operating conditions, one or both of the ambient light filters 252 and 255, in the solid line position shown in FIG. 7, will be effective to reduce the ambient light passing therethrough and effective at the ambient light sensor 407 to control the brightness of the screens 103 and 103A, and light rays applied at the combining mirror 109 so as to maintain the desired brightness ratio between that of the screens 103 and 103A of the cathode-ray tubes 102 and 102A and the effective ambient light through the further electronic control affected by the brightness ratio control networks 405 and 405A.

Figure 6:
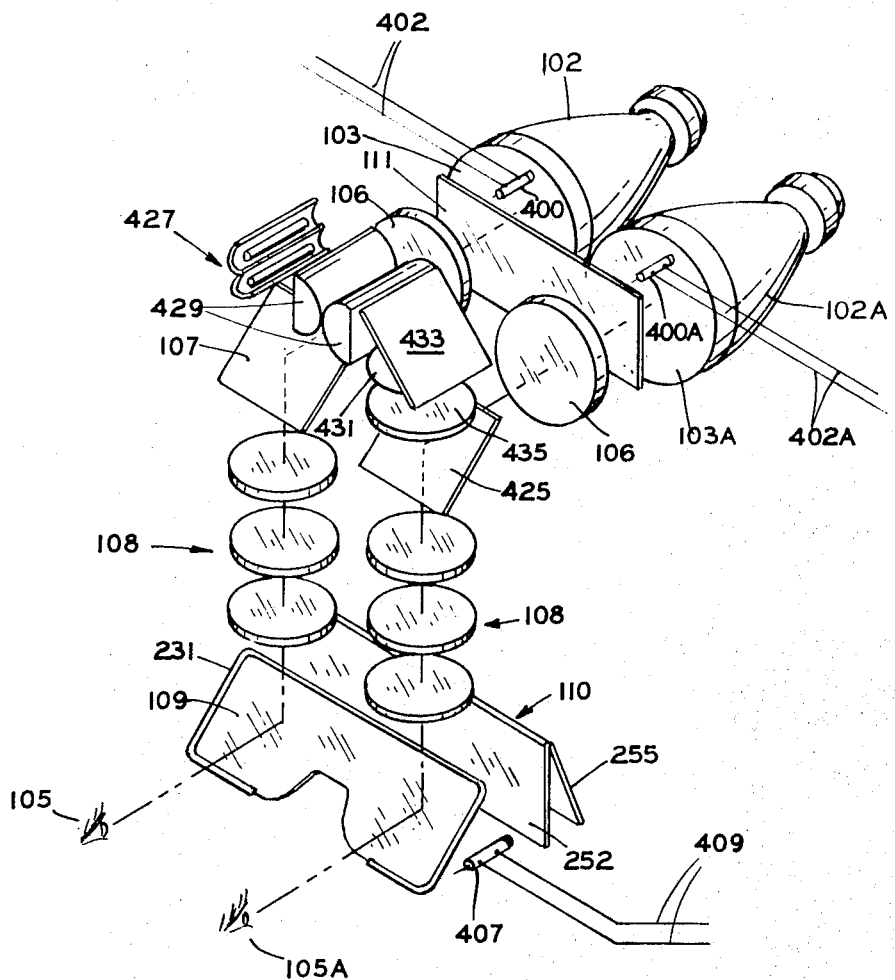
FIG. 6 is a schematic view of an optical system embodying a modified form of the invention of FIG. 5 and showing means to integrate reticle optical information into the display system, as described and claimed in the aforenoted U.S. application Ser. No. 872,909.

In the further modified form of the invention illustrated schematically in FIG. 6 corresponding numerals indicate corresponding parts of those heretofore described with reference to FIG. 5. The modified form of the invention of FIG. 6 is applicable to provide means to display information in addition to the ground landing information of FIG. 5 as for military operations in which reticle information may be incorporated for weapon delivery.

Integration of the reticle information is accomplished through the provision of a combining mirror 425 in place of a front surface mirror 107. The combining mirror 425 may be of a conventional partial reflecting type similar to the mirror 109 and through which there is combined with the reticle information an image projected by the screen 103A of the photocathode tube 102A through the field lens 106 onto the partial reflecting mirror 425.

The reticle information is produced by a projector composed of a suitable light source 427, condensing lenses 429, a reticle producing device 431, and a front surface mirror 433 so positioned as to reflect the light rays from the condensing lenses 429 through the reticle producing device 431 and a field lens 435 and thereby through the partially reflecting combining mirror 425. At the mirror surface of the combining mirror 425, the information supplied through the field lens 435 is combined with an image reflected at the mirror surface of the partially reflecting combining mirror 425 so that the light rays from the reticle producing device 431 passes through the combining mirror 425 and is directed into the collimating lens system 108 together with the reflected image on the combining mirror 425 from the screen 103A of the cathode-ray tube 102A.

As thus combined, the reticle information from the reticle producing device 431 and the image from the screen 103A are projected onto the combining mirror 109. This information is in turn combied together with the true world view, as seen through the combining mirror 109 by the eye of the observer 105A, as shown by FIG. 6.

The other portion of the combining mirror 109, as seen through the eye 105 of the observer, is substantially the same as that heretofore described with reference to FIG. 5. Of course, if it is desired that such reticle information be also provided to both eyes of the observer the other half of the system may be similarly modified to effect the desired result.

In the operation of the device of FIGS. 1 and 4, it should be borne in mind, that the combining mirrors 51 and 63 in FIG. 1 and the combining mirror 109 in FIG. 4 are placed in close underlaying and adjacent relation to the observers eyes so that large angles of view are obtainable with relatively small optical elements.

Further, the arrangement of the display device 14 and 100 permits the pilot of the aircraft to view in the partially reflecting mirrors 51 and 63 of FIG. 1 and 109 of FIG. 4 the image of the landing conditions of the aircraft provided by the cathode-ray tube means together with the true landing conditions of the aircraft discernible through the mirror means while concurrently the pilot may view through the mirror means the instruments on the panel 500 in the proximity of the display device 14 and 100 so as to enable the pilot to effectuate a safe landing of the aircraft.

The optical schematic of FIG. 5 illustrates the fundamental principle of the optical display device 100 in which the rays of light from the images on each cathode-ray tube screen 103 and 103A, after passing through the collimating lens system 108 are parallel, so as to fulfill the requirement for infinity vision. These parallel rays are combined with rays from a distant object, also parallel, by a combining mirror 109 so that the image on the cathode-ray tube screen 103 and 103A appears superimposed upon the view of the distant object.

In order to make maximum use of the picture thus generated on the screens 103 of the cathode-ray tubes 102, it is necessary that the same be projected into the line of the pilot's vision 105. Because the pilot is concentrating his attention and focusing his vision on distant objects, outside the aircraft, "objects at infinity," the optical information projected into the pilot's vision must be also focused at infinity or collimated.

As shown in FIG. 5, this is accomplished through the individual field lenses 106, mirrors 107, collimating lens system 108, and the single combining mirror 109.

If the same information is displayed on the screen of each cathode-ray tube 102 and 102A then the total effect of the information portrayed on the screen of both of the cathode-ray tubes will be integrated into one image, at infinity, by the eyes and brain.

Other optical elements shown by FIGS. 5, 7, 9 and 10 are the ambient filters 110 used by the operator in conjunction with the cathode-ray tube brightness ratio controls 405 and 405A to obtain the desired contrast ratio of display to "real outside world." The night filter 111 which is actuated by the lever 180, as shown by FIGS. 7, 9 and 10, is used to reduce the effective brightness of the screens 103 and 103A of the respective cathode-ray tubes 102 and 102A for night flight conditions. It is not possible to reduce the brightness of the cathode-ray tubes sufficiently through electronic means. This is more a deficiency of the cathode-ray tubes than the associated electronics of the brightness ratio control networks 405 and 405A.

Although several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

1. An optical display device for use on an aircraft to supply to the eyes of a person an image of a landing runway for the aircraft during low visibility conditions; said optical display device comprising means for supplying a pictorial image of substantial spacial identity to that of a physical array of beacons outlining the landing runway, partially reflecting mirror means carried by the display device and projecting from an underside of the display device at an obtuse angle relative to said underside of the display device toward said person so as to be positioned in an adjacent and underlaying relation to both of the eyes of said person and between the eyes of said person and the landing runway so that there may be viewed through the partially reflecting mirror means such of the beacons outlining the landing runway as may be viewable under prevailing low visibility conditions, other optical elements mounted in the display device, said other optical elements including a collimating optical system cooperating with said supply means and arranged between said image supply means and the partially reflecting mirror means so that the image presented by said supply means may be superimposed by the collimating optical system on so much of the image of said beacons as may be viewable through the partially reflecting mirror means under the prevailing low visibility conditions, a mechanism for supporting the optical display device, mounting means projecting from an interior surface of the aircraft for carrying the supporting mechanism so as to maintain the partially reflecting mirror means in alignment with a boresight of the aircraft, and releasable means for connecting the optical display device to a helmet to be worn by said person for permitting only a limited extent of motion of said person relative to the display device, and the extent of the motion of said person being so limited as to retain the partially reflecting mirror means in the underlaying relation with the eyes of said person and in alignment with the boresight of the aircraft during the extent of the limited motion of said person permitted by said supporting mechanism and connecting means.

2. An optical display device for use on an aircraft to supply to the eyes of a person an image of a landing runway for the aircraft during low visibility conditions; said optical display device comprising means for supplying a pictorial image of substantial spacial identity to that of a physical array of beacons outlining the landing runway, partially reflecting mirror means carried by the display device and projecting from an underside of the display device at an obtuse angle relative to said underside of the display device toward said person so as to be positioned in an adjacent and underlaying relation to both of the eyes of said person and between the eyes of said person and the landing runway so that there may be viewed through the partially reflecting mirror means such of the beacons outlining the landing runway as may be viewable under prevailing low visibility conditions, other optical elements mounted in the display device, said other optical elements including a collimating optical system cooperating with said supply means and arranged between said image supply means and the partially reflecting mirror means so that the image presented by said supply means may be superimposed by the collimating optical system on so much of the image of said beacons as may be viewable through the partially reflecting mirror means under the prevailing low visibility conditions, a mechanism for supporting the optical display device so as to maintain the partially reflecting mirror means in the underlaying relation with the eyes of said person, the image supply means including a single cathode-ray tube having a screen for supplying an image of substantial spacial identity to that of the physical array of beacons outlining the landing runway for the aircraft, a rotatable element including a plurality of reflecting shutters arranged in a spaced relation, means for rotating the reflecting shutters of the element in operative relation to the screen of said cathode-ray tube for alternately reflecting from said shutters and permitting the passage through the spaces between said shutters of light rays supplied from said screen, and said collimating optical system including a first collimating optical means operatively arranged between the rotatable element and the partially reflecting mirror means for transmitting the reflected light rays from said shutters to said partially reflecting mirror means, a second collimating optical means operatively arranged between said rotating device and the partially reflecting mirror means for transmitting the light rays passing through the spaces between said shutters to said partially reflecting mirror means so that a pictorial image of the physical array of beacons supplied by the cathode-ray tube screen may be viewed in the partially reflecting mirror means during such low visibility conditions, and wherein the means for rotating the reflecting shutters includes motor means carried by the display device for driving said rotatable shutter element at such a speed that the shutters and the spaces therebetween may be divided timewise into light ray reflective and transmissive areas so that an unattenuated view of the image supplied by the cathode-ray tube screen may be viewed in the partially reflecting mirror means.

3. An optical display device for use on an aircraft to supply to the eyes of a person an image of a landing runway for the aircraft during low visibility conditions; said optical display device comprising means for supplying a pictorial image of substantial spacial identity to that of a physical array of beacons outlining the landing runway, partially reflecting mirror means carried by the display device and projecting from an underside of the display device at an obtuse angle relative to said underside of the display device toward said person so as to be positioned in an adjacent and underlaying relation to both of the eyes of said person and between the eyes of said person and the landing runway so that there may be viewed through the partially reflecting mirror means such of the beacons outlining the landing runway as may be viewable under prevailing low visibility conditions, other optical elements mounted in the display device, said other optical elements including a collimating optical system cooperating with said supply means and arranged between said image supply means and the partially reflecting mirror means so that the image presented by said supply means may be superimposed by the collimating optical system on so much of the image of said beacons as may be viewable through the partially reflecting mirror means under the prevailing low visibility conditions, a mechanism projecting from an interior surface of the aircraft for supporting the optical display device so as to maintain the partially reflecting mirror means in alignment with a boresight of the aircraft and in operative relation to said person on the aircraft, and means for releasably fastening the display device to said person with the partially reflecting mirror means being positioned in alignment with the eyes of said person and the boresight of the aircraft, the supporting mechanism and fastening means permitting only a limited extent of motion of said person relative to the display device, and the extent of the motion of said person being so limited as to retain the partially reflecting mirror means in the underlaying relation with the eyes of said person and in alignment with the boresight of the aircraft.

4. An optical display device for use on an aircraft to supply to the eyes of a person an image of a landing runway for the aircraft during low visibility conditions; said optical display device comprising a pair of cathode-ray tubes carried by the display device, each cathode-ray tube including a screen for supplying a pictorial image of substantial spacial identity to that of a physical array of beacons outlining the landing runway, partially reflecting mirror means carried by the display device and projecting from an underside of the display device at an obtuse angle relative to said underside of the display device toward said person so as to be positioned in an adjacent and underlaying relation to both of the eyes of said person and between the eyes of said person and the landing runway so that there may be viewed through the partially reflecting mirror means such of the beacons outlining the runway as may be viewable under prevailing low visibility conditions, a first field lens operative to transmit light rays therethrough from the image appearing on the screen of one of said pair of cathode-ray tubes, a second field lens operative to transmit light rays therethrough from the image appearing on the screen of the other of said pair of cathode-ray tubes, a first collimating lens system and a second collimating lens system, said first and second collimating lens systems being operatively arranged for transmitting in parallel form light rays to said partially reflecting mirror means, a first mirror angularly positioned in relation to said first field lens so as to reflect the light rays transmitted through the first field lens to the first collimating lens system, a second mirror angularly positioned in relation to said second field lens so as to reflect the light rays transmitted through the second field lens to the second collimating lens system, the partially reflecting mirror means being positioned in an operative relation to the first and second collimating lens systems so as to reflect the light rays transmitted by the collimating lens systems to the eyes of said person so that each eye of said person may obtain a clear and unattenuated view of the image supplied by the screens of the respective pair of cathode-ray tubes, and separatedly adjustable means to angularly position the first and second mirrors in relation to the respective first and second field lenses and in relation to the first and second collimating lens systems so that the positions of the reflected light rays on the partially reflecting mirror means may substantially coincide with a position of so much of the light rays from an image of the physical array of beacons as may be viewable through the partially reflecting mirror means during prevailing low visibility conditions.

5. In an optical display means by which a person on an aircraft may view landing conditions for the aircraft in flight, the optical display means being of a type including light projecting means having a screen for supplying an image of a landing runway for the aircraft, means for transmitting variable intensity light rays from the image on the screen, partially reflecting mirror means for reflecting the light rays transmitted from the image supplied by the screen, whereby said person may view on the mirror means the reflected image of the landing runway for the aircraft provided by the screen of the light projecting means while at the same time said person may view through the partially reflecting mirror means other variable intensity ambient light rays from an image of so much of the true landing runway as may be discerned by said person from the aircraft during prevailing low visibility conditions; the improvement comprising light filter means, operator-operative means to selectively render the light filter means effective to reduce the intensity of the light rays from at least one of said images so that the variable intensity light rays from the respective images and effective in the optical display means may be maintained within a predetermined brightness ratio range.

6. The improvement defined by claim 5 in which the light filter means includes means which may be rendered selectively effective by the operator-operative means to reduce the intensity of the light rays from the image on the screen of the light projecting means under night operating conditions, whereupon the variable intensity light rays from the respective images and effective in the optical display means may be maintained within the predetermined brightness ratio range.

7. The improvement defined by claim 5 in which the light filter means includes means which may be rendered selectively effective by the operator-operative means to reduce the intensity of the other light rays from the image of the true landing runway under daytime operating conditions in which the intensity of the ambient light rays may exceed a predetermined intensity, whereupon the variable intensity light rays from the respective images and effective in the optical display means may be maintained within the predetermined brightness ratio range.

8. The improvement defined by claim 5 in which the light filter means includes a first light filter device and a second light filter device, and the operator-operative means includes a first manually operable means to selectively render the first light filter device operative to reduce intensity of the light rays from the image on the screen of the light projecting means under night operating conditions, and a second manually operable means to selectively render the second light filter device operative to reduce intensity of the other light rays from the image of the true landing runway under daytime operating conditions in which the ambient light conditions may exceed a predetermined intensity.

9. The improvement defined by claim 5 in which the light filter means includes a light filter device carried by the optical display means and slidably positioned relative to the screen of the light projecting means from a first operative to a second inoperative position, and the operator-operative means includes a manually operable arm to selectively position the light filter device to the first operative position to reduce the intensity of the light rays from the image on the screen of the light projecting means and alternately to the second inoperative position relative to the screen of the light projecting means.

10. The improvement defined by claim 5 in which the light filter means includes a plurality of light filter devices carried by the optical display means, each of said filter devices being selectively positioned angularly relative to the partially reflecting mirror means from a first raised inoperative position to a second lowered operative position intermediate the mirror means and the image of the true landing runway so as to reduce the intensity of the other light rays from so much of the true landing runway as may be discerned by said person on the aircraft through the partially reflecting mirror means.

11. The improvement defined by claim 5 in which the light filter means includes a light filter device carried by the optical display means and slidably positioned relative to the screen of the light projecting means from a first operative to a second inoperative position, and the operator-operative means includes a manually operable arm to selectively position the light filter device to the first operative position to reduce the intensity of the light rays from the image on the screen of the light projecting means and alternately to the second inoperative position relative to the screen of the light projecting means, a plurality of other light filter devices carried by the optical display means, each of said other light filter devices being selectively positioned angularly relative to the partially reflecting mirror means from a first raised inoperative position to a second lowered operative position intermediate the mirror means and the image of the true landing runway so as to reduce the intensity of the other light rays from so much of the true landing runway as may be discerned by said person on the aircraft through the partially reflecting mirror means.

12. The improvement defined by claim 5 in which the means for transmitting variable intensity light rays includes a field lens operative to transmit light rays therethrough from the image appearing on the screen of the light projecting means, a collimating lens system operatively arranged for transmitting in parallel form light rays to said partially reflecting mirror means, a mirror device angularly positioned in relation to said transmitted light rays so as to reflect the light rays transmitted through the field lens to the collimating lens system, the partially reflecting mirror means being positioned in an operative relation to the collimating lens system so as to reflect the light rays from the image transmitted by the collimating lens system to the eyes of said person, and adjustable means to angularly position the mirror device in relation to the collimating lens system and the light rays transmitted through the field lens so that the position of the reflected light rays on the partially reflecting mirror means may substantially coincide with a position of so much of the light rays from an image of the physical array of beacons as may be viewable through the partially reflecting mirror means during prevailing low visibility conditions.

13. The improvement defined by claim 12 in which the partially reflecting mirror means projects from an underside of the optical display means at an obtuse angle relative to said underside of the display means toward said person so as to be positioned in an adjacent and underlaying relation to both of the eyes of said person and between the eyes of said person and the landing runway so that there may be viewed through the partially reflecting mirror means such of the beacons outlining the runway as may be viewable under prevailing low visibility conditions, the light filter means includes a first light filter device carried by the optical display means and slidably positioned relative to the screen of the light projecting means from a first operative to a second inoperative position, and the operator-operative means includes a first manually operable arm to selectively position the first light filter device to the first operative position to reduce the intensity of the light rays from the image on the screen of the light projecting means under night operating conditions and alternately to the second inoperative position relative to the screen of the light projecting means under daytime operating conditions, a plurality of other second light filter devices carried by the optical display means and pivotally mounted relative to said partially reflecting mirror means, each of said other second light filter devices being selectively positioned angularly relative to the partially reflecting mirror means from a first raised inoperative position to a second lowered operative position intermediate the mirror means and the image of the true landing runway under daytime operating conditions in which the ambient light conditions may exceed a predetermined intensity, and each of said other second light filter devices in the lowered operative position being effective to reduce the intensity of the other ambient light rays from the image of so much of the true landing runway as may be discerned by said person on the aircraft through the partially reflecting mirror means.

14. An optical display device for use on an aircraft to supply to the eyes of a person an image of a landing runway for the aircraft during low visibility conditions; said optical display device comprising a pair of partially reflecting mirror devices carried by the display device and arranged to be positioned in an underlaying relation to both eyes of said person and in juxtaposition thereto between the eyes of said person and the landing runway so that through the partially reflecting mirror devices true landing conditions for the aircraft may be discerned, other optical elements mounted in the display device and offset from the view of said person, said other optical elements including a cathode-ray tube having a screen for supplying an image of substantial spacial identity to that of a physical array of beacons outlining the landing runway for the aircraft, a rotatable device including a plurality of reflecting shutters arranged in a spaced relation and in operative relation to the screen of said cathode-ray tube for reflecting light rays supplied from said screen, a first collimating optical device operatively arranged between the rotatable device and one of the reflecting mirror devices for transmitting reflected light rays from said shutters to one of said reflecting mirror devices, a second collimating optical device between said rotating device and the other of said mirror devices for transmitting light rays passing from said cathode-ray tube screen through the spaces between said shutters to said other mirror device so that a pictorial image of the physical array of beacons supplied by the cathode-ray tube screen may be viewed in the mirror devices during such low visibility conditions, motor means carried by the display device for driving said rotatable device at such a speed that the shutters and the spaces therebetween may be divided timewise into light ray reflective and transmissive areas so that an unattenutated view of the image supplied by the cathode-ray tube screen may be reflected by the mirror devices, a mechanism projecting from an interior surface of the aircraft for supporting the optical display device in operative relation to the eyes of said person and in alignment with a boresight of the aircraft, and means forreleasably fastening the display device to said person with the mirror devices being positioned in alignment with the boresight of the aircraft and the eyes of said person.

15. An optical display device for use on an aircraft to supply to the eyes of a person an image of a landing runway for the aircraft during low visibility conditions; said optical display device comprising means for supplying a pictorial image of substantial spacial identity to that of a physical array of beacons outlining the landing runway, a partially reflecting mirror means, in the direct view of the eyes of the person and the true landing runway, cooperating with said supply means, said supply means including a collimating optical system, said collimating optical system being so arranged that the image superimposed on said mirror means by said supply means may have a reflected size corresponding to that of such of the beacons as might be viewable through the partially reflecting mirror means under such low visibility conditions, and a mechanism integral with the aircraft for supporting the optical display device in an adjustable operative relation therein so as to maintain the partially reflecting mirror means in alignment with the eyes of said person, and releasable means for connecting the optical display device to a helmet to be worn by said person.

16. In an optical display means by which a person on an aircraft may view landing conditions for the aircraft in flight, the optical display means being of a type including light projecting means having a screen for supplying an image of a landing runway for the aircraft, means for transmitting variable intensity light rays from the image on the screen, partially reflecting mirror means for reflecting the light rays transmitted from the image supplied by the screen, whereby said person may view on the mirror means the reflected image of the landing runway for the aircraft provided by the screen of the light projecting means while at the same time said person may view through the partially reflecting mirror means other variable intensity ambient light rays from an image of so much of the true landing runway as may be discerned by said person from the aircraft during prevailing low visibility conditions; the improvement comprising light filter means, operator-operative means to selectively render the light filter means effective to reduce the intensity of the light rays from at least one of said images, and brightness ratio control means operatively connected to said light projecting means; said control means including first means responsive to the variable intensity light rays from the image on the screen of said light projecting means, and second means responsive to said other variable intensity light rays from the image viewed through said partially reflecting mirror means; and said brightness ratio control means regulating the light projecting means so as to maintain a predetermined brighness ratio between said first and second mentioned variable intensity light rays.

17. The improvement defined by claim 16 in which the light filter means includes means which may be rendered selectively effective by the operator-operative means to reduce the intensity of the light rays from the image on the screen of the light projecting means under night operating conditions so that the control means may thereupon regulate the light projecting means so as to effect the predetermined brightness ratio.

18. The improvement defined by claim 16 in which the light filter means includes means which may be rendered selectively effective by the operator-operative means to reduce the intensity of the other light rays from the image of the true landing runway under daytime operating conditions in which the ambient light conditions may exceed a predetermined intensity so that the control means may thereupon regulate the light projecting means so as to effect the predetermined brightness ratio.